(12) United States Patent
Projansky

(10) Patent No.: US 11,978,381 B2
(45) Date of Patent: May 7, 2024

(54) ORIENTATION-AGNOSTIC FULL-SCREEN USER INTERFACE DISPLAYS FOR ELECTRONIC DEVICES

(71) Applicant: Daniel Projansky, New York, NY (US)

(72) Inventor: Daniel Projansky, New York, NY (US)

(73) Assignee: OVERPLAY GAMES, INC., New York City, NY (US)

(\*) Notice: Subject to any disclaimer, the term of this patent is extended or adjusted under 35 U.S.C. 154(b) by 0 days.

(21) Appl. No.: 17/866,097

(22) Filed: Jul. 15, 2022

(65) Prior Publication Data

US 2023/0037081 A1 Feb. 2, 2023

Related U.S. Application Data

(60) Provisional application No. 63/226,928, filed on Jul. 29, 2021.

(51) Int. Cl.
*G09G 3/20* (2006.01)
*H04M 1/72454* (2021.01)

(52) U.S. Cl.
CPC ...... *G09G 3/2092* (2013.01); *H04M 1/72454* (2021.01); *G09G 2340/0442* (2013.01); *G09G 2340/045* (2013.01); *G09G 2340/0492* (2013.01); *G09G 2354/00* (2013.01); *H04M 2250/12* (2013.01)

(58) Field of Classification Search
CPC ......... G09G 3/2092; G09G 2340/0442; G09G 2340/045; G09G 2340/0492; G09G 2354/00; H04M 1/72454
See application file for complete search history.

(56) References Cited

U.S. PATENT DOCUMENTS

| | | | |
|---|---|---|---|
| 8,671,361 B2 | 3/2014 | Freyhult | |
| 9,766,788 B2 | 9/2017 | Kerr | |
| 10,460,765 B2 | 10/2019 | Bloch | |
| 10,554,926 B1 | 2/2020 | Post, Jr. | |
| 2009/0040308 A1* | 2/2009 | Ternovskiy | F41G 3/16 382/296 |
| 2012/0084699 A1 | 4/2012 | Sirpal | |
| 2014/0365909 A1* | 12/2014 | Kerr | G06F 1/1626 715/746 |

\* cited by examiner

*Primary Examiner* — Robert J Michaud
(74) *Attorney, Agent, or Firm* — FisherBroyles, LLP

(57) ABSTRACT

A system and method for control of user interfaces on electronic and/or computerized devices. The system and method display images, both still and video images, in an orientation-agnostic manner that is independent of a physical orientation of the display screen. This provides an interesting visual display effect whereby the image appears to remain in a fixed orientation (e.g., upright) relative to three-dimensional space, untethered to any position or orientation of the display screen and/or device, while the display screen and/or device is changed in position and/or orientation, such that the portion of the viewed image changes according to the dimensions and orientation of the screen relative to an apparent fixed orientation and/or position of the underlying image. Such a system and method for control of user interfaces provides for more efficient use of a display screen having a relatively limited size, as is common for smartphones and tablet computers.

24 Claims, 10 Drawing Sheets

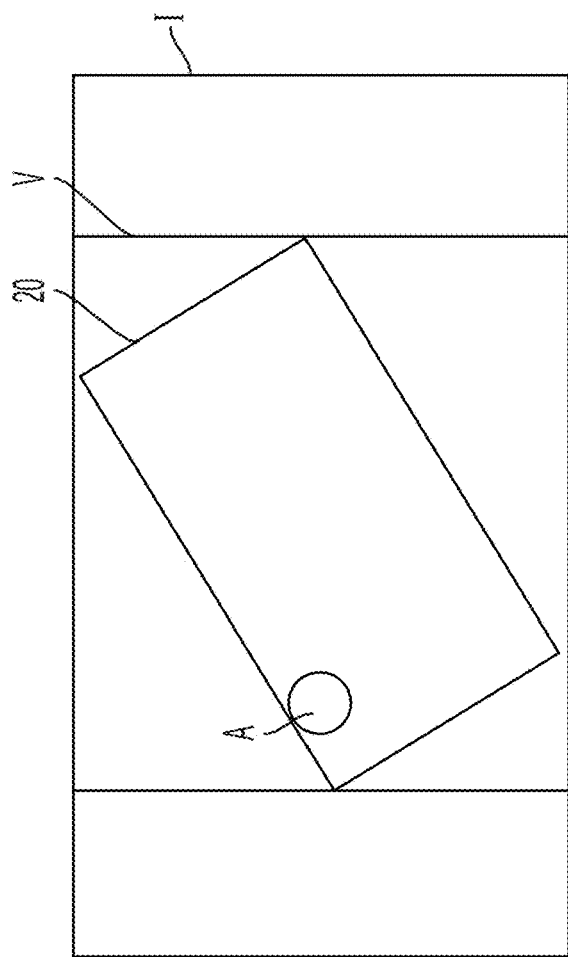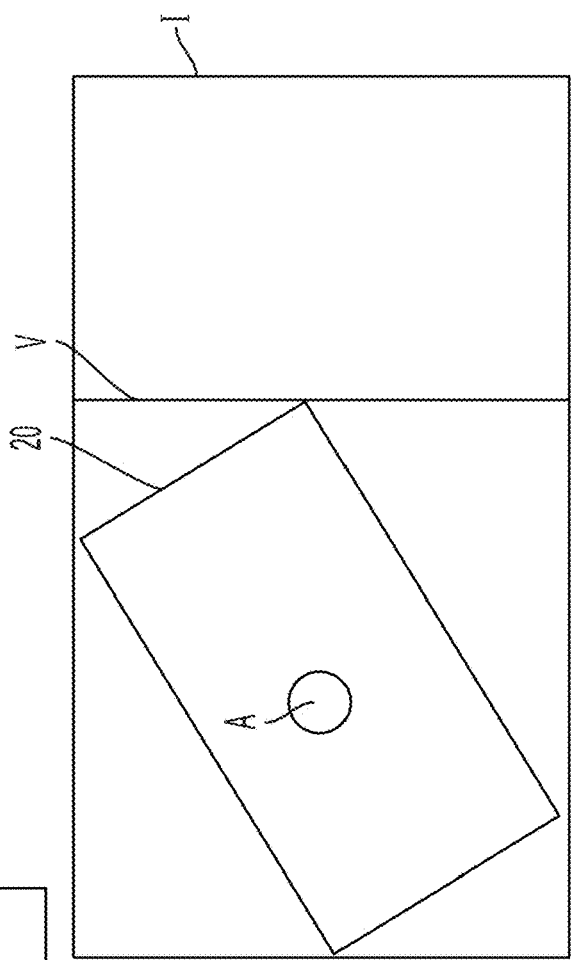

ORIENTATION-AGNOSTIC FULL-SCREEN USER INTERFACE DISPLAYS FOR ELECTRONIC DEVICES

CROSS-REFERENCE TO RELATED APPLICATION

This application claims the benefit of priority, under 35 U.S.C. § 119(e), of U.S. Provisional Patent Application No. 63/226,928, filed Jul. 29, 2021, the entire disclosure of which is hereby incorporated herein by reference.

FIELD OF THE INVENTION

The present invention relates generally to computerized information systems, and more particularly to a system and method for controlling a user interface to provide display of images in an orientation-agnostic manner independent of a physical orientation of the display screen, e.g., to provide for more efficient use of a display screen having a relatively limited size, as is common for smartphones and tablet computers.

DISCUSSION OF RELATED ART

Smartphones, tablet computers, laptop/notebook computers and other electronic devices generally include a display screen for displaying images to a user. The display screen, as a hardware device, has a display screen area that is fixed in size, and since these devices are typically desired to be handheld and/or portable devices, the display screens tend to be relatively small. In laptop/notebook/desktop computer, the display orientation is usually fixed relative to the device, and the user interface ("UI") typically remains fixed and matches the display orientation.

For some electronic devices, it is possible to manipulate the image to cause it to change the display orientation without changing the orientation of the device, e.g., to switch between a portrait and a landscape view of an image, or to rotate the image, relative to the display screen, by providing manual user input via an input device.

With handheld mobile devices, however, a user can easily rotate the electronic device in space such that the physical orientation of the display relative to the user changes. Some such devices, such as the iPhone or iPad manufactured and/or sold by Apple Inc. of Cupertino, California, include a gyroscope and accelerometer that is usable to discern the physical orientation of the device in space, and that accelerometer is commonly used to control the device's user interface to toggle the display of images on the display screen between a first state (a portrait-mode display) and a second state (a landscape-mode display), based on the output of the accelerometer. Accordingly, such devices provide an orientation-depending display of images/information.

It is common for smartphone, tablet and other handheld/mobile computing/electronic devices to have display screens with a rectangular form factor. Accordingly, displaying an image in both portrait and landscape orientations typically results in a scaled display of the image so that image is displayed across the full width of the display screen in the portrait mode (see FIG. 1) and displayed across the full height of the display screen in the landscape mode (see FIG. 2). Because most photographic and video images are captured to have a rectangular form factor, this typically results in a letterboxed-type display in which there is wasted/unused display screen space in which the image is not displayed in one or both of the display modes.

Alternatively, some creators of software choose to display images based on the orientation of the image (e.g., Netflix) as opposed to the orientation of the device, such that in the case that they do not match, the image is rotated by 90 degrees from the level ground, thus prompting the user to rotate their device in order to match the orientation of the image to their orientation in space.

By way of example, FIGS. 1-4 illustrate exemplary orientation-dependent user interface displays of images in accordance with the prior art. In FIG. 1, an image 10 is displayed in an upright position on a display screen 20 of an electronic device 50 oriented in a portrait-mode orientation, within the device's viewport area, in accordance with the prior art. The image 10 is scaled to occupy the entire width of the display screen 20, but in this example, there is wasted/unused area X of the display screen 20/viewport area above and below the image, due to a difference between the image size and the display screen size. It should be noted that in a common embodiment, both the image and the device's viewport area may have the same aspect ratio (in one orientation), and presently commonly in a 16:9 or 9:16 aspect ratio, and thus there may be no wasted/unused area X of the display screen 20/viewport area when in the aspect ratio orientation matches the device orientation.

In FIG. 2, the same image 10 is displayed in an upright position on a display screen 20 of an electronic device 50 oriented in a landscape-mode orientation, in accordance with the prior art. The image 10 is scaled to occupy the entire height (in this orientation) of the display screen 20, but there is wasted/unused area X of the display screen 20 on the left and right sides of the image, due to a difference between the image size and the display screen size.

In FIG. 3, the same image 10 is displayed in an upright position on a display screen 20 of an electronic device 50 oriented in a portrait-mode orientation, as in FIG. 1. Here, the device has been rotated clockwise from an upright position by an angle α that is less than 45 degrees, e.g., in a vertical plane. As is typical of the prior art, the display of the image on the display screen remains in the portrait orientation, as the device remains closer to a portrait orientation in space than a landscape orientation in space. In FIG. 4, the device has been rotated clockwise from an upright position by an angle α that is greater than 45 degrees, e.g., in a vertical plane. As is typical of the prior art, the display of the image on the display screen is now closer to a landscape orientation in space than a portrait orientation in space. Accordingly, as is representative of the prior art, the user interface has been controlled to toggle the display of the image 10 from the portrait mode to the landscape mode, as shown in FIG. 4.

Although these approaches allow the full-image to be viewable, which is desirable in many contexts, such automated orientation-dependent scaling of images (to view the entire image area) results in inefficient use (less than full utilization) of the available display screen area (device viewport), which makes viewing of images even more difficult than it would otherwise be on a display screen of limited size. Additionally, the unused areas of the display screen are part of the overall impression of the displayed image to the user, the user thus perceives what is effectively a combined image of the original image and the wasted space. This new combined image may have a negative impact on the strength and effectiveness of the transmission of content and meaning to the user compared to the original unaltered image. Additionally, such orientation-dependent toggling between portrait and display modes provides displays of images that are misaligned (e.g., angled) with respect to the user/viewer, who may remain in an upright position during rotation of the device.

What is needed is system and method for control of user interfaces to provide display of images in an orientation-agnostic manner independent of a physical orientation of the display screen, e.g., to provide for more efficient use of a display screen having a relatively limited size, as is common for smartphones and tablet computers, and to provide an upright image for matching a viewer's likely physical orientation in the real world. The present invention fulfills these needs, among others.

SUMMARY

The present invention provides a system and method for control of user interfaces to provide display of images (both still and video images) in an orientation-agnostic manner independent of a physical orientation of the display screen, e.g., to provide for more efficient use of a display screen having a relatively limited size, as is common for smartphones and tablet computers.

BRIEF DESCRIPTION OF THE FIGURES

An understanding of the following description will be facilitated by reference to the attached drawings, in which:

FIGS. 10-16 illustrate display of an exemplary interactive user interface responsive to spatial movement user prompts and inputs on an exemplary handheld computing device in accordance with an exemplary embodiment of the present invention.

DETAILED DESCRIPTION

The present invention relates to computerized systems and methods for control user interfaces displayable on computerized computing/electronic devices. More specifically, the present invention provides a system and method for control of user interfaces to provide display of images in an orientation-agnostic manner independent of a physical orientation of the display screen, e.g., to provide for more efficient use of a display screen having a relatively limited size, as is common for smartphones and tablet computers. An exemplary embodiment of the present invention is discussed below for illustrative purposes.

Figure 1:
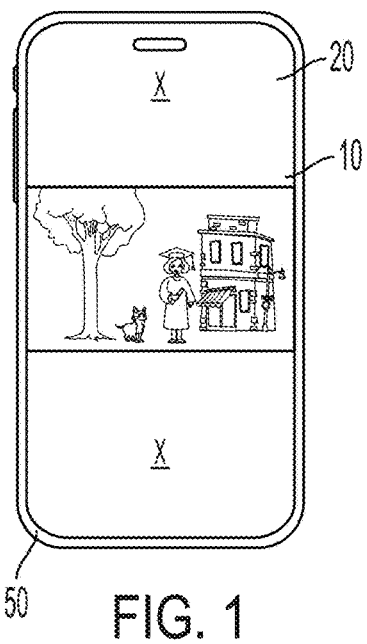
FIGS. 1-4 illustrate exemplary orientation-dependent user interface displays of images in accordance with the prior art.
Figure 2:
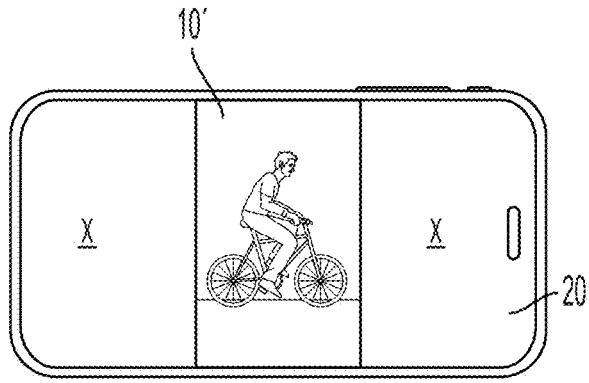
Figure 3:
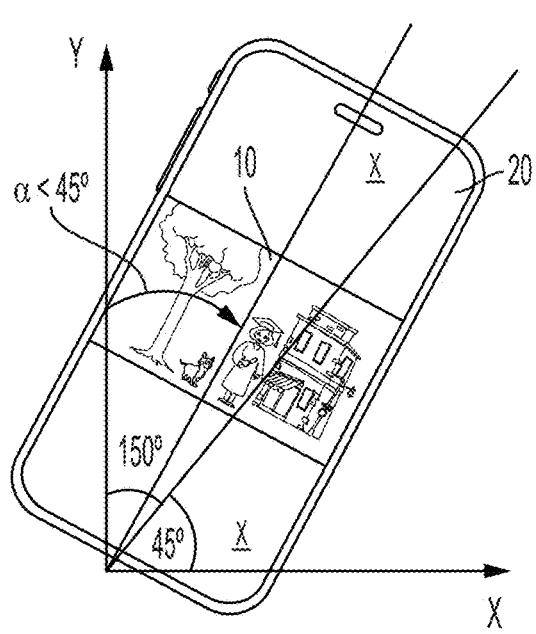
Figure 4:
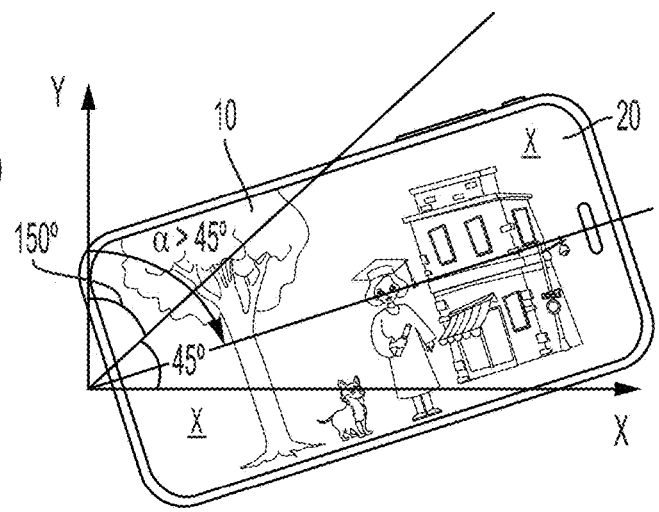
Figure 5:
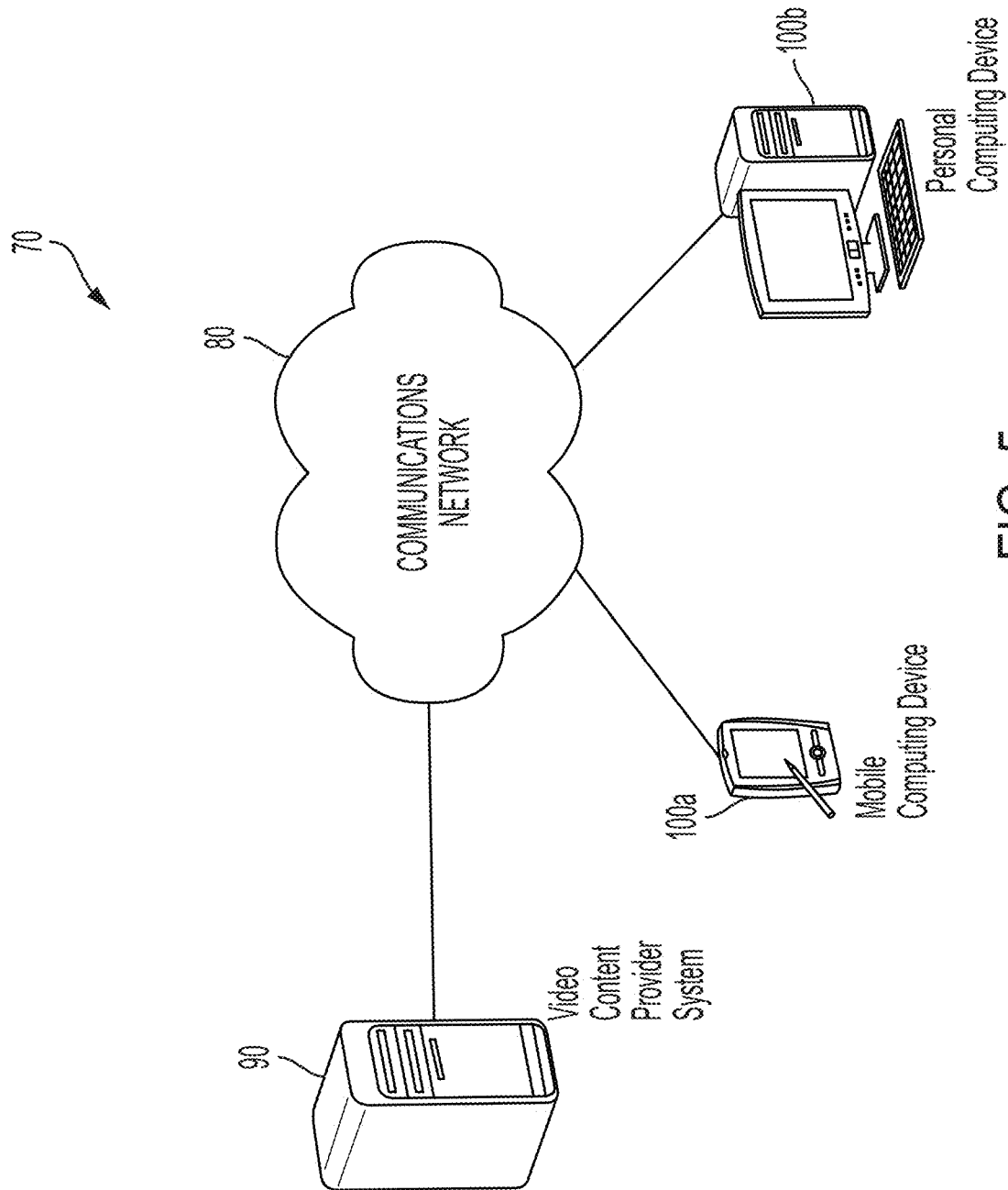
FIG. 5 is a system diagram showing an exemplary network computing environment in which the present invention may be employed.

The present invention may be understood with reference to the exemplary simplified network environment 70 of FIG. 5. As shown in FIG. 5, the exemplary network environment 70 includes a conventional video content provider system 90, which may be a web server. As further illustrated by FIG. 5, the exemplary network computing environment 70 further includes computing devices, such as mobile computing device 100a and personal computing device 100b. Any suitable computing devices may be used for the purposes described herein. By way of example, the mobile computing device 100a may be a smartphone, a tablet computer, or the like that includes conventional hardware and software and is able to communicate with the video content provider system 90 and execute software applications for the purposes described herein. Similarly, the personal computing device 100b may be a desktop personal computer (PC), laptop computer, tablet computer or the like that includes conventional hardware and software and is able to communicate with the video content provider data system 90 and execute software applications for the purposes described herein. Alternatively, the computing device 100b may be a game console or game system such as an Xbox, PlayStation, or the like, or an information appliance, such as an as Apple TV, Amazon Fire TV and Google Chromecast, Mi box, television, or the like.

In this exemplary embodiment, the video content provider system 90 is operatively connected to the computing devices 100a, 100b via a communications network 80, such as the Internet and/or a Virtual Private Network (VPN) connection. Hardware and software for enabling communication of data by such devices via such communications networks are well known in the art and beyond the scope of the present invention, and thus are not discussed in detail herein.

Figure 6:
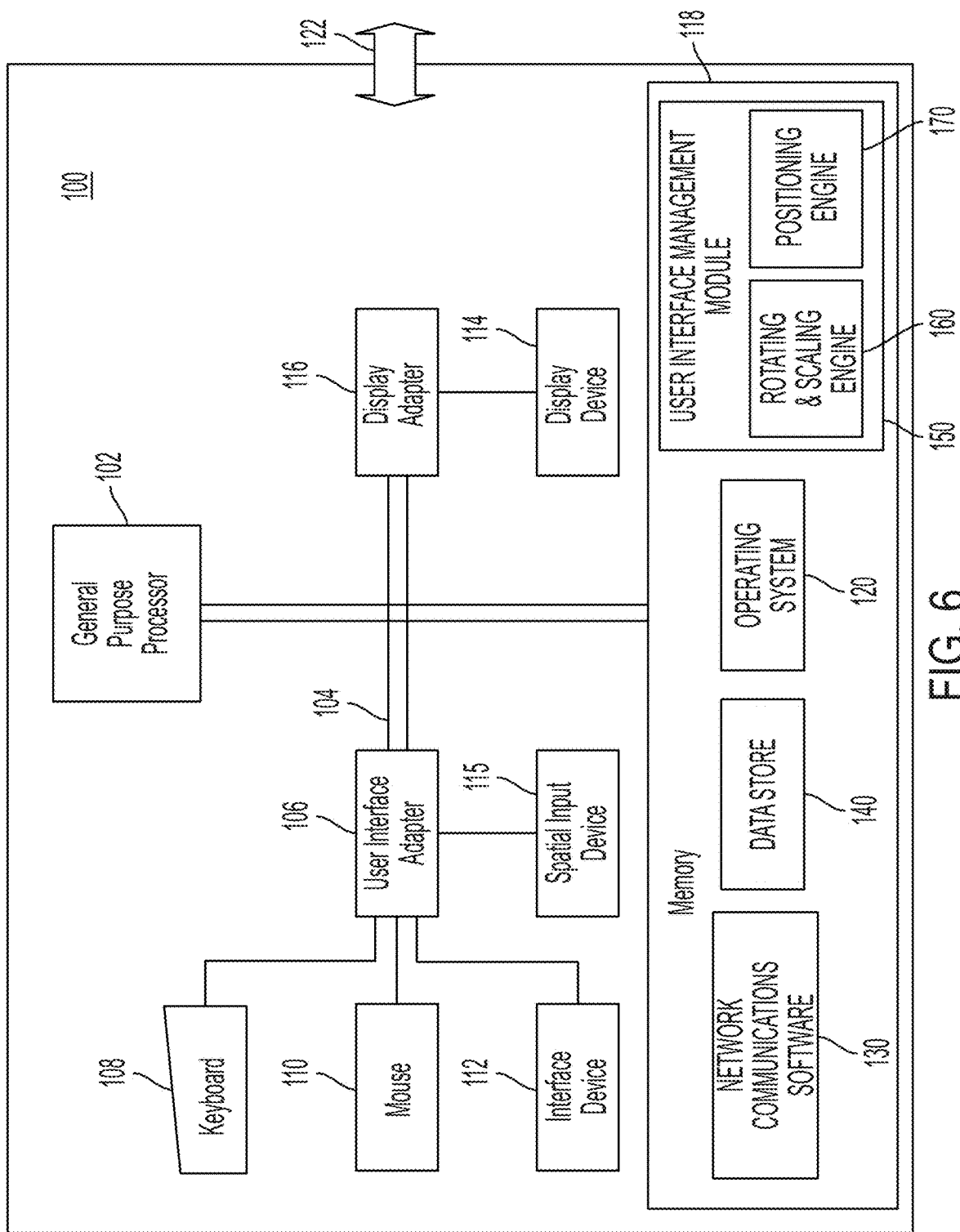
FIG. 6 is a schematic diagram of an exemplary special-purpose computing device in accordance with an exemplary embodiment of the present invention.

FIG. 6 is a block diagram showing an exemplary Orientation-Agnostic User Interface Display System (OAUIDS) 100 (either mobile computing device 100a or personal computing device 100b) in accordance with an exemplary embodiment of the present invention. The OAUIDS 100 is a special-purpose computer system that includes conventional computing hardware storing and executing both conventional software enabling operation of a general purpose computing system, such as operating system software 120 and network communications software 130, and specially-configured computer software for configuring the general purpose hardware as a special-purpose computer system including a User Interface Management Module (UIMM) 150 for carrying out at least one method in accordance with the present invention. By way of example, the communications software 130 may include conventional web browser software, and the operating system software 120 may include iOS, Android, Windows, or Linux software.

Accordingly, the exemplary OAUIDS 100 of FIG. 26 includes a general-purpose processor, such as a microprocessor (CPU), 102 and a bus 104 employed to connect and enable communication between the processor 102 and the components of the presentation system in accordance with known techniques. The exemplary presentation system 100 includes a user interface adapter 106, which connects the processor 102 via the bus 104 to one or more interface devices, such as a keyboard 108, mouse 110, and/or other interface devices 112, which can be any user interface device, such as a touch sensitive screen, digitized entry pad, etc. The bus 104 also connects a display device 114, such as an LCD screen or monitor, to the processor 102 via a display adapter 116. The bus 104 also connects the processor 102 to memory 118, which can include a hard drive, diskette drive, tape drive, etc.

In this example, the OAUIDS 100 includes a spatial input device 115 for sensing the orientation of the device in space, e.g., movement, acceleration and/or position/orientation inputs to the device. By way of example, the spatial input device 115 may include a camera and/or micro-electromechanical systems (MEMS), such as magnetometer, accelerometer and/or gyroscope sensors for sensing movement, acceleration and/or position/orientation inputs, and associated hardware and software of a type presently found in many conventional smartphone and tablet computers for such purposes.

The OAUIDS 100 may communicate with other computers or networks of computers, for example via a communications channel, network card or other network interface (e.g., via a Bluetooth of WiFi connection) or modem 122. The game system 100 may be associated with such other computers in a local area network (LAN) or a wide area network (WAN), and may operate as a server in a client/server arrangement with another computer, etc. Such configurations, as well as the appropriate communications hardware and software, are known in the art.

The OAUIDS 100 is specially-configured in accordance with the present invention. Accordingly, as shown in FIG. 6, the game system 100 includes computer-readable, processor-executable instructions stored in the memory for carrying out the methods described herein. Further, the memory stores certain data, e.g., in databases or other data stores of the memory 118, without regard to any particular embodiment in one or more hardware or software components. For example, FIG. 6 shows schematically storage in the memory 118 of the UIMM 150, a Rotation and Scaling Engine 160 e.g., specially-configured software, and a Positioning Engine 170, e.g., specially-configured software. Optionally, other software and/or data may be stored in the memory 118.

Figure 7:
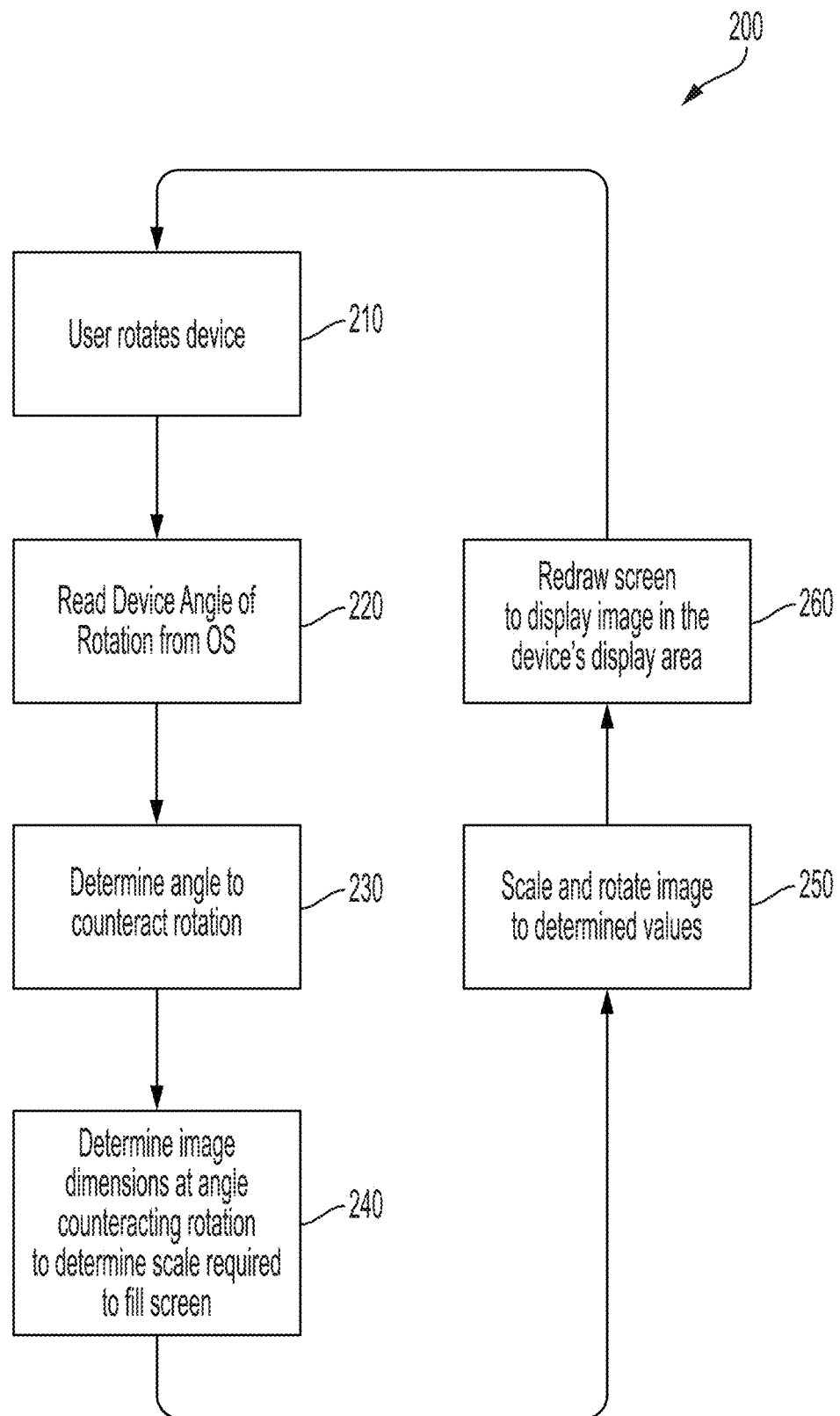
FIG. 7 is a flow diagram illustrating an exemplary method for creation of interactive user interfaces that are responsive to user engagement with displayed elements on the interface of a computerized device in accordance with an exemplary embodiment of the present invention.

FIG. 7 is a flow diagram 200 illustrating an exemplary method for control of user interfaces to provide display of images in an orientation-agnostic manner independent of a physical orientation of the display screen, e.g., to provide for more efficient use of a display screen having a relatively limited size, as is common for smartphones and tablet computers, in accordance with an exemplary embodiment of the present invention.

Referring now to FIG. 7, a OAUIDS 100 in accordance with the present invention may be held in the user's hand, etc. As shown in the exemplary from diagram of FIG. 7, the method begins with the user's rotation/tilting (collectively, referred to as rotation) of the OAUIDS 100, in physical space, while a user interface is displaying an image (e.g., a background/foreground screen image, a photographic image, a video image, or any other content image) via the display screen of the OAUIDS 100, as shown at 210.

As noted above, the OAUIDS 100 includes a spatial input device 115 (such as an accelerometer, gyroscope, magnetometer and/or camera for sensing movement, acceleration and/or orientation) that allows it to discern the angle of orientation (e.g., relative to vertical) of the OAUIDS 100, and thus it's display screen. For example, the spatial input device 115 may gather raw accelerometer data interpretable to discern the angle of orientation, and thus to determine, for example, if the OAUIDS 100/display screen is in an upright/portrait, sideways/landscape, or other orientation, such as 30, 35 or 60 degrees from vertical. This device orientation data is received, and if needed, interpreted, as shown at 220 in FIG. 7. Such receipt and/or interpreting may be performed, for example, by the operating system (OS) of the device and/or the Rotation and Scaling Engine (RSE) 160 of the User Interface Management Module (UIMM) 150 of the OAUIDS 100, in accordance with the present invention.

Next, in accordance with the present invention, the OAUIDS 100, e.g., the RSE 160 of the UIMM 150, determines (e.g., calculates using trigonometry or other mathematical relationships) a corrective angle of rotation to be applied to the display of the images in the user interface of the OAUIDS 100, on its display screen 20/114, as shown at 230. For example, if a rotation of the OAUIDS 100 in space is determined to be 23 degrees clockwise from vertical, then the corrective angle of rotation may be calculated to be 23 degrees counterclockwise, to counteract the rotation/tilting of the device. Accordingly, although the physical device may be rotated in a vertical plane, the displayed image will appear vertically/level/upright throughout the rotation of the device. This helps to provides a visual effect that the device is rotating in spaced around the image, while the image is fixed in space.

In accordance with the exemplary embodiment of FIG. 7, the orientation-agnostic effect and the utilization of the physical display area of the screen (device viewport) is further enhanced by scaling the image. Accordingly, as shown in FIG. 7, the method next involves determining virtual image/viewport dimensions (e.g., width and/or height) and scaling the image accordingly, so that the displayed image on the device will fill (or possibly exceed) the physical display area of the device (device viewport). This may be accomplished, for example, by the determining the dimensions of a virtual version of the image—namely a version of the image that may not be displayed fully, but that would have a width and/or height, when oriented vertically/level/upright in this example, such that the image would be large enough to be displayed on the physical device to fill the physical device's viewport/display screen area at the current angle of rotation/orientation of the device. This provides an indication of how much the image must be re-scaled to file the entire area of the display screen 20/114 of the device at the corresponding angle of tilt of the OAUIDS 100. This is illustrated in FIG. 8.

Figure 8:
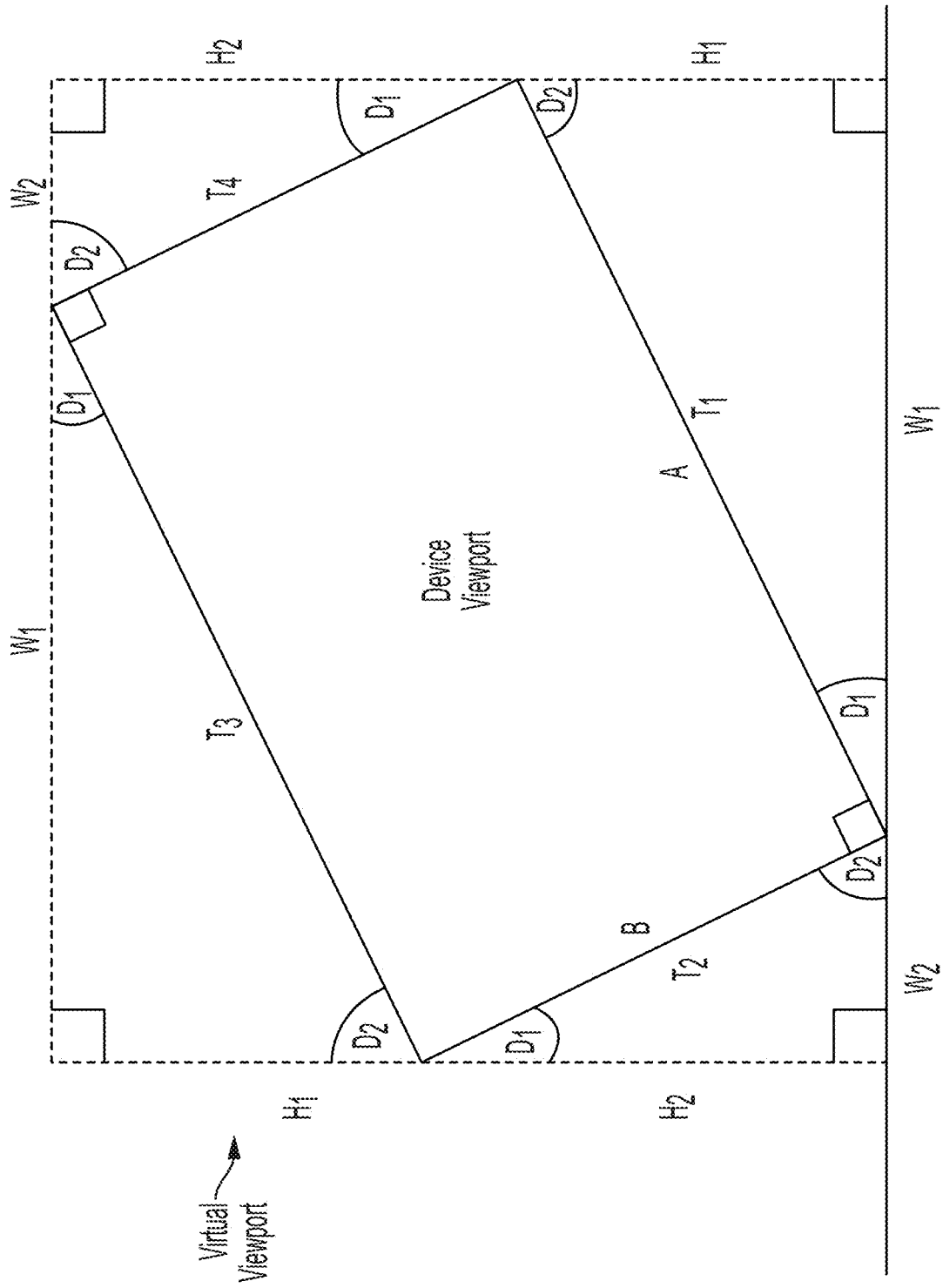
FIG. 8 illustrates an exemplary determination of scaling necessary to display an interactive user interface responsive to spatial movement user prompts and inputs on an exemplary handheld computing device in accordance with an exemplary embodiment of the present invention.

Referring now to FIG. 8, it will be appreciated that determining the virtual viewport/virtual image dimensions (for an image in an upright/vertical or other "home" position) is dependent upon the angle of tilt of the physical device having a physical display area/device viewport. Accordingly, to determine the scaling required, virtual viewport dimensions are determined. The virtual viewport is effectively the minimum-size rectangle (in the home position of the image, e.g., vertical/level) that needs to be "covered" by the scaling of the video or other image (rotated to remain vertical/level) in order to fill the physical device viewport/screen.

The dimensions of the virtual viewport may be determined in any suitable fashion, e.g., using any suitable mathematical equations or relationships. By way of non-limiting illustrative example, for a physical device having display screen/device viewport dimensions having a width (A) and height (B), when the device is rotated (e.g., in a vertical plane), the device's accelerometer/etc. hardware and OS, etc. software determines the angle of rotation (D1) of the physical device (in this example, relative to a horizontal orientation of the device/vertical plane, as shown in FIG. 8), and the RSE 160 determines the dimensions of the virtual viewport/virtual image dimensions based on the rotation of the device by determining the width and height of two triangles T1, T2 using the one known angle (D1) one derived angle (D2) and the known hypotenuse (A) for one triangle (T1) and the known hypotenuse (B) for the other triangle (T2) using trigonometric or other mathematical equations and/or relationships. The virtual image dimensions/virtual viewport dimensions are thus determined, to have a width corresponding to the combined widths of the derived triangles (W1+W2), and a height corresponding to the combined height of the derived triangles (H1+H2). Accordingly, an image having the dimensions of the virtual viewport would fill the device viewport (display screen area) then the device is oriented with the corresponding degree of tilt D1, as sill be appreciated from FIG. 8.

Next, the RSE 160 rescales and rotates the displayed images to apply the corrective angle of rotation and the corrective rescaling, and the redraws/refreshes the image displayed on the display screen 20/114 of the OAUIDS 100, as shown at 250 and 260, to provide the orientation-agnostic display effect. As used here, the terms scaling and re-scaling are used to encompass not only scaling (which changes the magnification of the video), but also stretching which (allows a single axis, vertical or horizontal, to be magnified and/or shrunk independently, effectively adjusting the aspect ratio), and/or filling (an automated method of stretching that takes advantage of a known screen aspect ratio), and/or any combination thereof.

The scaling of the source/original image required to provide a virtual image having the dimensions of the virtual viewport can be determined in any suitable manner, e.g., by comparing the aspect ratio of the virtual viewport to the aspect ratio of the source image/video to determine whether width or height is the minimum dimension from which to calculate scaling. For example, it may be determined that at the moment of a tilt angle of W degrees clockwise from vertical, the image would have to be scaled by X % to fill the entire area of the display screen, and at the moment of a tilt angle of Y degrees clockwise, the image would have to be scaled by Z % to fill the entire area of the display screen, etc., to avoid a letterboxed effect and associated unused area of the display screen. FIGS. 10-13 illustrate display of an exemplary interactive user interface responsive to spatial movement user prompts and inputs on an exemplary handheld computing device in accordance with an exemplary embodiment of the present invention.

Figure 9:
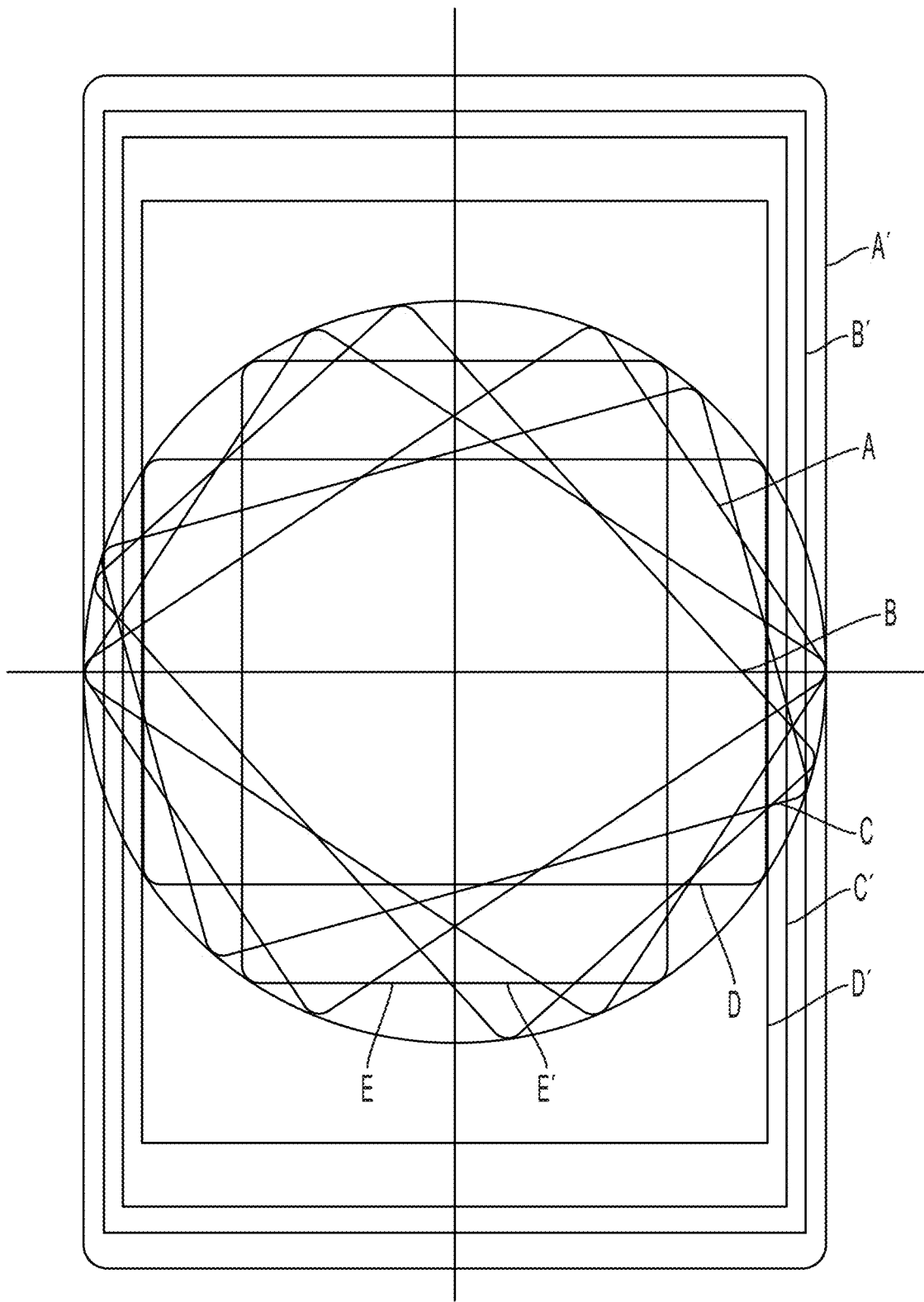
FIG. 9 illustrates that the scaling necessary to display the interactive user interface varies as a function of spatial movement user prompts and inputs on an exemplary handheld computing device in accordance with an exemplary embodiment of the present invention.
Figure 10:
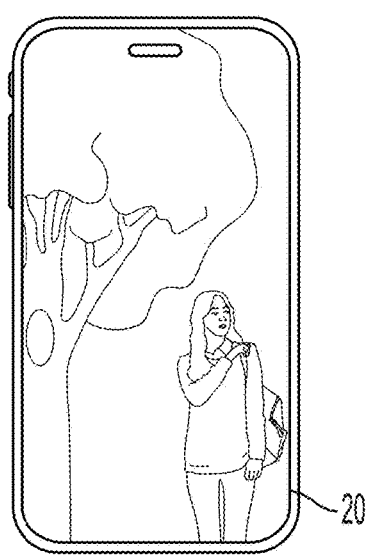
Figure 11:
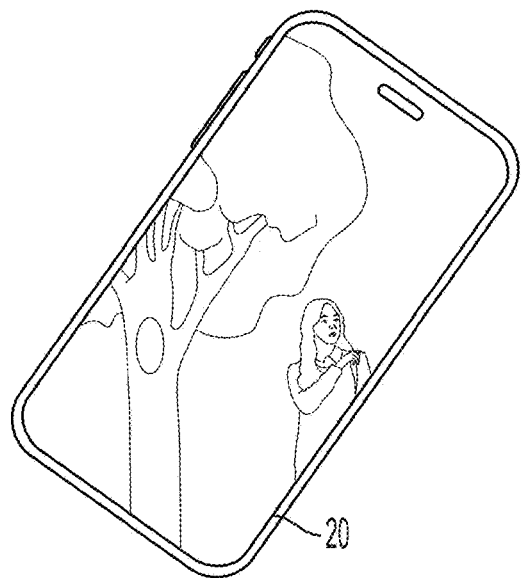
Figure 12:
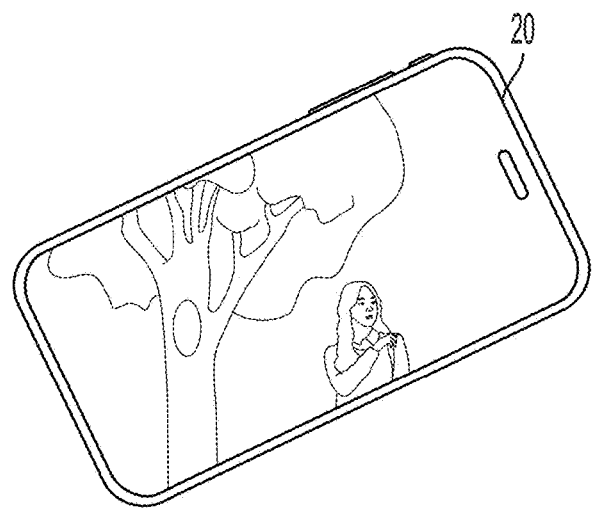
Figure 13:
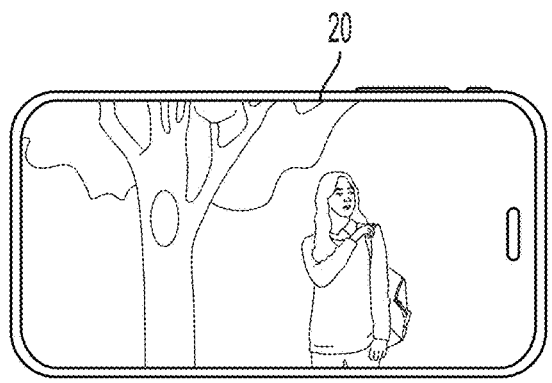

Accordingly, it should be noted that the necessary scaling at any point in time is dependent upon the device's tilt angle/orientation in space at that moment in time, and thus that the scaling requirements are not constant. It should be noted that this tiling/rescaling/redisplaying steps may be performed repeatedly in loop fashion, to provide real-time or near-real time displays accounting for the dynamic tilting/variation in tilting of the device over time, to provide the best orientation-agnostic visual effect, particular for video images. Accordingly, the scaling of a single still or video image may vary over time as a device's tilt angle is changed over time. FIG. 9 illustrates that the scaling necessary to display the interactive user interface varies as a function of tilt angle. For example, the image may be scaled to virtual dimensions to have a virtual viewport as shown at A' for a physical device tilt angle corresponding to the position of the display viewport provided by the physical display screen 20 at position A, and be scaled to different virtual dimensions B', C', D', E' for physical device tilt angles corresponding to the positions of the display viewport provided by the physical display screen 20 at respective positions B, C, D, E, as shown in FIG. 9. This will be appreciated from the images displayed in the device viewport orientations/display screens 20 shown in FIGS. 10-13.

Further still, it will be appreciated that the scaling for any particular tilt angle is dependent upon the size/aspect ratio of the original image. For example, for a 9:16 (portrait) aspect ratio video image, the scaling required may be approximately 162% at a 23% tilt angle. Notably, the scaling would be applied to any scaling already applied to make it fit the screen before tilting. It should be further noted that the scaling may be applied asymmetrically in the x- and y-directions to achieve the desired goal and also reduce hidden image loss. For example, it may be desirable to scale a video image's width 162%, but only scale the video image's height 157% in order minimize hidden image loss.

Accordingly, the present invention transforms the image (still or video) to an appropriate scale and aspect ratio to fill the display screen during all degrees of device screen rotation while minimizing both unneeded over-scaling and minimizing deformation of the images to a level that is not easily noticeable to a casual/average user.

Thus, the corrective angle of rotation may be applied to the display of the images on the display screen of the OAUIDS 100 to counteract the physical rotation of the OAUIDS 100 in space. The visual effect of this rotation, which is preferably performed quickly so as to be perceived as in "real time", is that the display of the image displayed appears to be independent of the orientation of the OAUIDS 100 in space. Further, this may be done repeatedly, e.g., in increments of 1 degree of tilt or less, to avoid the "toggling" effect. Accordingly, for example, the image may appear to remain upright continuously even as the physical OAUIDS 100 and its display screen are rotated/tiled clockwise and/or counterclockwise, so that the image appears untethered to/independent of the OAUIDS 100. Further still, the present invention may provide an effect that the orientation of the image is maintained in an upright position, essentially level relative to the ground, no matter the orientation of the device, at all (at least in a vertical plane) angular positions of the device relative to the ground.

It will be appreciated that in some images, a certain portion of the image may be more relevant or more desirable, for viewing purposes, than the rest. Accordingly, rather than displaying the entire image (scaled effectively, about its geometric center, to be displayed to fill the entire display screen in all angular orientations of the device), it may be desirable to identify a sub-portion of the entire image and re-scale/display (rotated) the image relative to an identified interest anchor, which may not coincide with the actual geometric center, but rather may be determined according to the content of the image. In certain embodiments, there may be a tradeoff between the additional amount of scaling required to include image, or a portion of the image, fully, and negative effects on the image such as due to extensive scaling, stretching, etc. In some cases, it may be preferable to display less than the full image, or less image relative to an interest anchor, to ensure that certain limits relative to a desired maximum amount of image scaling, stretching, etc. are not exceeded. By way of example, an interest anchor at the extreme left edge of a 16:9 image, can easily be accommodated in portrait mode by fully left-justifying the image. However, as rotation occurs scaling would have to be significantly greater to accommodate the interest anchor compared to a centrally-located interest anchor during a full rotation to landscape (at which point it would once again be visible). During the rotation, a threshold for maximum scaling and/or stretching, etc. may be compared to the center-anchor-required scaling that would be applied, and preference may be given to avoiding over-scaling/stretching, resulting in the interest anchor being eccentrically located (to lessen the scaling stretching) than it would otherwise be if the interest anchor were centrally-located. In extreme cases, the interest anchor region may not be visible on the display screen. By way of example, the location of the interest anchor may be determined by a manual review and annotation/marking of the interest anchor in a post-image-capture review/processing manually, or by computer vision/image processing in an automated/computerized fashion, e.g., by monitoring for movement and/or localized changes in the image or using other known techniques. It will be noted that, in some cases, the interest anchor will result in a scaling different from the one utilizing an exact center of the image anchor, but that in other cases the required scaling allows the image to be vertically or horizontally shifted to highlight the interest anchor with requiring additional scaling.

Notably, the anchor position may vary from image to image (according to the image content), and may vary its position over time, for example with respect to video image (according to the changes in the image content over time, within the video). Accordingly, an interest anchor can be identified either as a single value for the whole image/video, or as a dynamic value that corresponds to the image's/video's playback time. Effectively, the purpose of the interest anchor is to identify a point representative of a central portion of the best/most interesting/most relevant portion of the image, for display purposes. Any suitable technique may be used to identify the interest anchor with respect to the image. For example, the offset could be specified based upon computer vision analysis utilized to recognize the highest area of likely interest, or specific recognizable features of the image content, such as human heads. It could be also set manually, or by observing viewers of the videos' eye lines as a proxy for area of interest.

The location of the interest anchor may be identified by an offset indicator, which may identify the interest anchor relative to a known registration point, such as any of the four corners of the image or its the geometric center. By way of example, the interest anchor may be identified by x/y offset values (distances) relative to a known registration point, e.g., in pixels or otherwise.

Accordingly, in the exemplary embodiment of FIG. 6, the UIMM 150 of the OAUIDS 100 further includes a Positioning Engine (PE) 170 for identifying and/or tracking the interest anchor of the image, and for supplying interest anchor location information to the RSE 160, so that rotation/scaling and/or display of the image in the manners generally described above can be performed relative to the interest anchor, rather than relative to a geometric center or other portion of the image. Accordingly, in the case that the image (e.g., video) is scaled as a function of rotation such that parts of the image are not visible, the video can then be rotated/scaled/displayed centered around the interest anchor/center offset position. This might (or might not) affect the calculations of scale in order to accommodate adjust to, or towards, the offset.

In other words, a video might look better if it's shifted a little to the right (or left). This can affect the scale calculation, particularly at positions in-between landscape or portrait rotations, and affect what portion of the full video image the user sees in all rotations, including landscape and portrait orientations.

For example, in FIGS. 14A and 14B, an exemplary image I is shown relative to a device viewport//display screen 20 and a virtual viewport V, that in this exemplary case is a portion of the image I. In this example, the image I has an interest anchor A relative to the image I, which may be for examples, faces in an image, or an element in the foreground, or a particularly active area of video images, etc. FIG. 14A shows the result of scaling and generic position, e.g., centering (default device behavior), of the image relative to the screen, as described above, apart from use of the interest anchor A. This particular display may be relatively less desirable to a viewer because the main point of interest (the interest anchor A) of the image is at the peripheral edge of the device's display screen 20.

However, in accordance with the present invention, FIG. 14B shows the result of scaling and interest-anchor-aware positioning, where the interest anchor may be a point location, or an area or region of a predetermined size. Accordingly, FIG. 14B shows the image I shifted in relation to the device screen 20 and virtual viewport V to position the interest anchor A closer to the center of the arear of the device screen 20, while still ensuring that the image fills the device viewport/screen 20. The result is that the interest anchor A and associated image content is better centered in the visible area of the device screen 20/viewport.

Figure 15A:
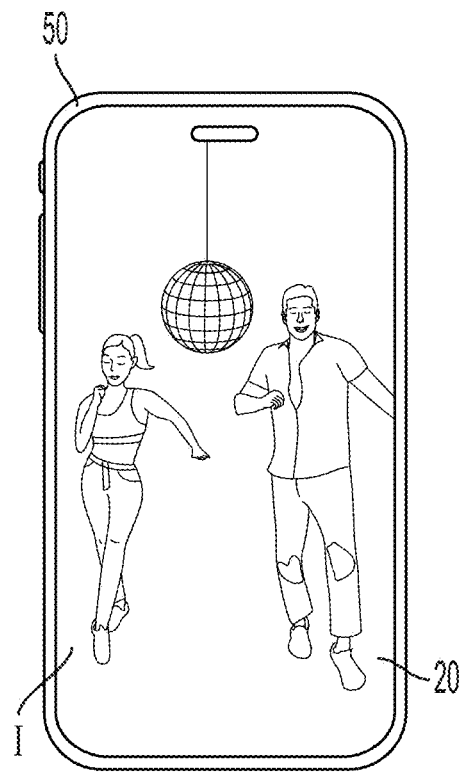
Figure 15B:
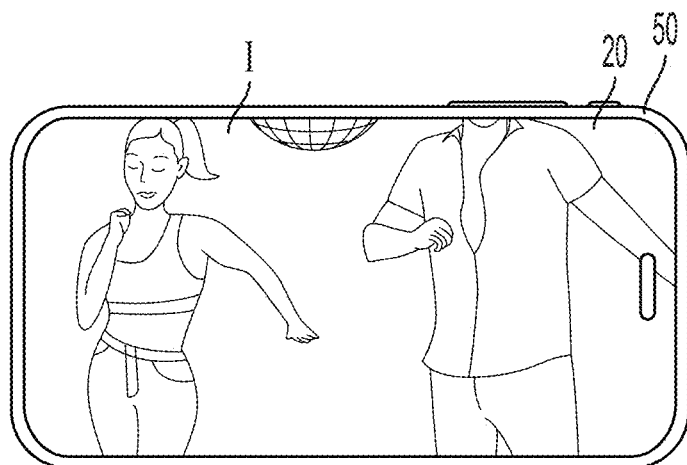
Figure 15C:
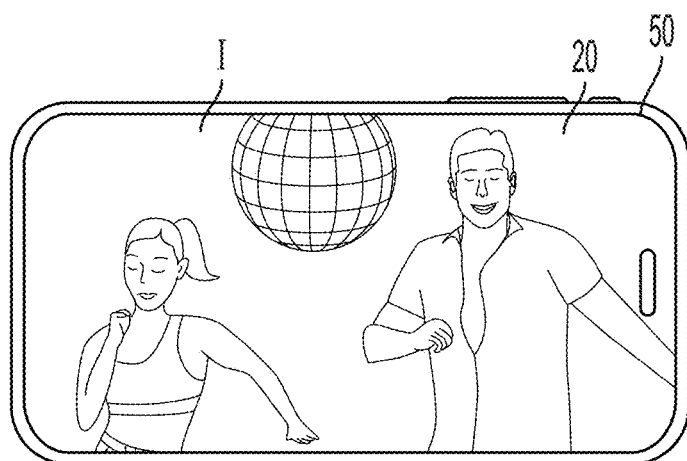

This is further illustrated in FIGS. 15A-15C. FIG. 15A shows an image I of dance video content in a portrait orientation on device viewport/display screen 20 of device 50. When the device 50 is rotated 90 degrees (e.g., in a vertical plane) to a landscape orientation, the image I of the dance video content is displayed in a landscape orientation on device viewport/display screen 20 of device 50, as shown in FIG. 15B. In this exemplary default configuration, the virtual image is vertically centered relative to the device viewport/display screen 20, and hence predominantly the dancers' torsos are shown, but not their faces. It may be more desirable to show the dancers' faces, and thus an interest anchor may be associated with the video in a position relative to the video content to cause display of their faces instead of their torsos, such that the virtual image is not vertically centered relative to the device viewport/display screen 20, but rather is positioned to be better centered (not necessarily centered, strictly speaking) about the interest anchor, as illustrated in FIG. 15C. The positioning may be applied after the act of image rotation, to make the transition feel natural.

It should be noted that zooming means adjusting the width and height in equal measures, and stretching (unequal zooming) means adjusting the width and height in unequal measures. Scaling includes both zooming and stretching. Generally, the goal is for the virtual viewport to be fully filled by the image. A simple way to do that is to zoom the image so that it is big enough to cover the required area. However, increasing zoom is associated with both a loss of quality and an increase of the portion of the video that goes unseen. The loss of quality and loss of visible area can be reduced by changing the dimensions in non-uniform fashion, e.g., separately with respect to width and height, so that they exactly fill the virtual viewport rectangle.

Figure 16:
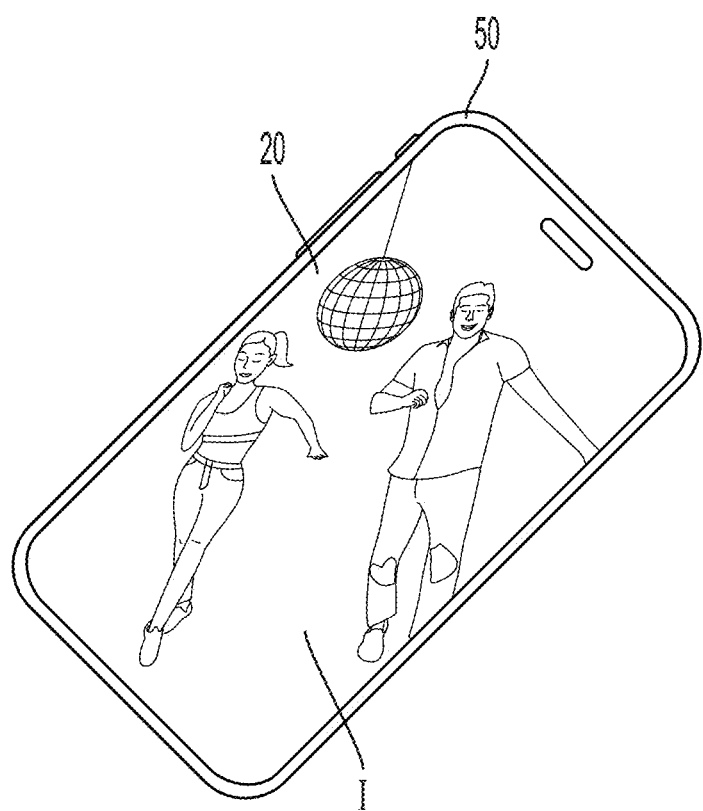

This may be appreciated from the user interface window and image displayed herein in FIG. 16. As shown in FIG. 16, though the portion of the image not visible is greatly reduced and the quality of the video is better maintained, the video appears very distorted (note the width and oval shape of the dancer's head) due to the stretching by unequal amounts in the image width and height directions. Rescaling involving application of a combination of zooming and stretching may provide the best visual result having the least noticeable effect on visual appearance to the typical viewer. More specifically, each dimension (width and height) can be zoomed separately, but not so that the amount they are scaled differently from each other results in a distortion to the video which is perceptibly worse than the loss of quality and increase to the portion of unseen video being avoided. The degree to which this may be deemed acceptable is a matter of design choice, and any suitable degree may be used. Further, efforts to keep the interest area region visible in the device's display viewport may have an effect on the amount of unequal (width v. height) stretching that is utilized for a particular image.

Additionally, computer readable media storing computer readable code for carrying out the method steps identified above is provided. The computer readable media stores code for carrying out subprocesses for carrying out the methods described herein.

A computer program product recorded on a computer readable medium for carrying out the method steps identified herein is provided. The computer program product comprises computer readable means for carrying out the methods described above.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A computer-implemented method for control of a user interface to provide display of images in an orientation-agnostic manner independent of a physical orientation of a display screen, the method comprising the following implemented by a computerized orientation-agnostic user interface display system comprising at least one processor, and a memory operatively coupled to the processor and storing instructions executable by the processor for carrying out the method, the method comprising:
    detecting, by a spatial input device of the orientation-agnostic user interface display system, an orientation of a display screen of the system in space;
    determining a corrective angle, relative to the display screen, to counteract the orientation of the display screen, the corrective angle causing display of an image in a predetermined home orientation relative to space;
    determining required image dimensions for display of the image to fill the display screen when oriented at the corrective angle relative to the display screen, said determining of required image dimensions comprising determining at least one of a width and a height of a virtual viewport required to at least one of fill and exceed a physical display area of the display device;
    scaling the image to the required image dimensions, if necessary; and
    displaying the scaled image on the display screen in an angular orientation relative to the display screen corresponding to the corrective angle.

2. The method of claim 1, wherein said detecting comprises receiving data from at least one of a camera a magnetometer sensor, an accelerometer sensor and a gyroscope sensor.

3. The method of claim 1, wherein said determining of required image dimensions comprises determining a minimum image size required to fill the display screen when oriented at the corrective angle relative to the display screen.

4. The method of claim 1, wherein said determining of required image dimensions comprises determining the dimensions by performing mathematical calculations based upon trigonometric relationships as a function of an angular position of the device's display screen.

5. The method of claim 1, wherein said detecting of the orientation of the display screen in space comprises determining an angle of rotation relative to a vertical axis.

6. The method of claim 5, wherein said determining of the corrective angle to counteract the orientation of the display screen comprises determining an angle of opposite rotation relative to the one of the vertical axis.

7. The method of claim 1, wherein said scaling of the image to the required image dimensions comprises at least one of scaling to change a magnification of the image and stretching to cause asymmetric scaling of the image, and filling to fill a display screen area having a known aspect ratio.

8. An orientation-agnostic user interface display system comprising:
    a processor;
    a display operatively coupled to the processor;
    an input device operatively coupled to the processor; and
    a memory operatively coupled to the processor, the memory storing executable instructions that, when executed by the processor, causes the orientation-agnostic user interface display system to perform a method for controlling a user interface to provide display of images in an orientation-agnostic manner independent of a physical orientation of the display screen, the method comprising:
    detecting, by a spatial input device of the orientation-agnostic user interface display system, an orientation of a display screen of the electronic device in space;
    determining a corrective angle, relative to the display screen, to counteract the orientation of the display screen, the corrective angle causing display of an image in a predetermined home orientation relative to space;
    determining required image dimensions for display of the image to fill the display screen when oriented at the corrective angle relative to the display screen, said determining of required image dimensions comprising determining at least one of a width and a height of a virtual viewport required to at least one of fill and exceed physical display area of the display device;
    scaling the image to the required image dimensions, if necessary; and
    displaying the scaled image on the display screen in an angular orientation relative to the display screen corresponding to the corrective angle.

9. The orientation-agnostic user interface display system of claim 8, wherein said memory further stores instructions for detecting comprises receiving data from at least one of a camera a magnetometer sensor, an accelerometer sensor and a gyroscope sensor.

10. The orientation-agnostic user interface display system of claim 8, wherein said memory further stores instructions for determining of required image dimensions comprises determining a minimum image size required to fill the display screen when oriented at the corrective angle relative to the display screen.

11. The orientation-agnostic user interface display system of claim 8, wherein said memory further stores instructions for determining of required image dimensions comprises determining the dimensions by performing mathematical calculations based upon trigonometric relationships as a function of an angular position of the device's display screen.

12. The orientation-agnostic user interface display system of claim 8, wherein said memory further stores instructions for detecting of the orientation of the display screen in space comprises determining an angle of rotation relative to a vertical axis.

13. The orientation-agnostic user interface display system of claim 12, wherein said memory further stores instructions for determining of the corrective angle to counteract the orientation of the display screen comprises determining an angle of opposite rotation relative to the vertical axis.

14. The orientation-agnostic user interface display system of claim 8, wherein said memory further stores instructions for scaling of the image to the required image dimensions comprises at least one of scaling to change a magnification of the image and stretching to cause asymmetric scaling of the image, and filling to fill a screen image area having a known aspect ratio.

15. A computer program product for implementing a method for control of a user interface to provide display of images in an orientation-agnostic manner independent of a physical orientation of the display screen, the computer program product comprising a non-transitory computer-readable medium storing executable instructions that, when executed by a processor, cause an orientation-agnostic user interface display system to perform a method comprising:
   detecting, by a spatial input device of the orientation-agnostic user interface display system, an orientation of a display screen of the electronic device in space;
   determining a corrective angle, relative to the display screen, to counteract the orientation of the display screen, the corrective angle causing display of an image in a predetermined home orientation relative to space;
   determining required image dimensions for display of the image to fill the display screen when oriented at the corrective angle relative to the display screen, said determining of required image dimensions comprising determining at least one of a width and a height of a virtual viewport required to at least one of fill and exceed physical display area of the display device;
   scaling the image to the required image dimensions, if necessary; and
   displaying the scaled image on the display screen in an angular orientation relative to the display screen corresponding to the corrective angle.

16. The computer program product of claim 15, wherein said instructions for detecting comprise instructions for receiving data from at least one of a camera a magnetometer sensor, an accelerometer sensor and a gyroscope sensor.

17. The computer program product of claim 15, wherein said instructions for determining of required image dimensions comprise instructions for determining a minimum image size required to fill the display screen when oriented at the corrective angle relative to the display screen.

18. The computer program product of claim 15, wherein said instructions for determining of required image dimensions comprise instructions for determining the dimensions by performing mathematical calculations based upon trigonometric relationships as a function of an angular position of the device's display screen.

19. The computer program product of claim 15, wherein said instructions for detecting of the orientation of the display screen in space comprise instructions for determining an angle of rotation relative to a vertical axis.

20. The computer program product of claim 19, wherein said instructions for determining of the corrective angle to counteract the orientation of the display screen comprise instructions for determining an angle of opposite rotation relative to the one of the earth-level plane and the vertical axis.

21. The computer program product of claim 15, wherein said instructions for scaling of the image to the required image dimensions comprise at least one of scaling to change a magnification of the image and stretching to cause asymmetric scaling of the image, and filling to fill a screen image area having a known aspect ratio.

22. A computer-implemented method for control of a user interface to provide display of images in an orientation-agnostic manner independent of a physical orientation of a display screen, the method comprising the following implemented by a computerized orientation-agnostic user interface display system comprising at least one processor, and a memory operatively coupled to the processor and storing instructions executable by the processor for carrying out the method, the method comprising:
   detecting, by a spatial input device of the orientation-agnostic user interface display system, an orientation of a display screen of the system in space;
   determining a corrective angle, relative to the display screen, to counteract the orientation of the display screen, the corrective angle causing display of an image in a predetermined home orientation relative to space;
   determining required image dimensions for display of the image to fill the display screen when oriented at the corrective angle relative to the display screen;
   scaling the image to the required image dimensions, if necessary;
   identifying an interest anchor position relative to the image; and
   displaying the scaled image on the display screen in an angular orientation relative to the display screen corresponding to the corrective angle and with the interest anchor located more closely toward a geometric center of the display screen.

23. An orientation-agnostic user interface display system comprising:
   a processor;
   a display operatively coupled to the processor;
   an input device operatively coupled to the processor; and
   a memory operatively coupled to the processor, the memory storing executable instructions that, when executed by the processor, causes the orientation-agnostic user interface display system to perform a method for controlling a user interface to provide display of images in an orientation-agnostic manner independent of a physical orientation of the display screen, the method comprising:
   detecting, by a spatial input device of the orientation-agnostic user interface display system, an orientation of a display screen of the electronic device in space;
   determining a corrective angle, relative to the display screen, to counteract the orientation of the display screen, the corrective angle causing display of an image in a predetermined home orientation relative to space;
   determining required image dimensions for display of the image to fill the display screen when oriented at the corrective angle relative to the display screen;
   scaling the image to the required image dimensions, if necessary;
   identifying an interest anchor position relative to the image; and
   displaying the scaled image on the display screen in an angular orientation relative to the display screen corresponding to the corrective angle and with the interest anchor located more closely toward a geometric center of the display screen.

24. A computer program product for implementing a method for control of a user interface to provide display of images in an orientation-agnostic manner independent of a physical orientation of the display screen, the computer program product comprising a non-transitory computer-readable medium storing executable instructions that, when executed by a processor, cause an orientation-agnostic user interface display system to perform a method comprising:
- detecting, by a spatial input device of the orientation-agnostic user interface display system, an orientation of a display screen of the electronic device in space;
- determining a corrective angle, relative to the display screen, to counteract the orientation of the display screen, the corrective angle causing display of an image in a predetermined home orientation relative to space;
- determining required image dimensions for display of the image to fill the display screen when oriented at the corrective angle relative to the display screen;
- scaling the image to the required image dimensions, if necessary;
- identifying an interest anchor position relative to the image; and
- displaying the scaled image on the display screen in an angular orientation relative to the display screen corresponding to the corrective angle and with the interest anchor located more closely toward a geometric center of the display screen.

* * * * *